(12) United States Patent
Fujimoto et al.

(10) Patent No.: US 11,670,333 B2
(45) Date of Patent: Jun. 6, 2023

(54) MAGNETIC TAPE HAVING CHARACTERIZED COEFFICIENT OF VARIATION OF E-IRON OXIDE POWDER PARTICLE SIZE, MAGNETIC TAPE CARTRIDGE, AND MAGNETIC RECORDING AND REPRODUCING APPARATUS

(71) Applicant: FUJIFILM Corporation, Tokyo (JP)

(72) Inventors: Takashi Fujimoto, Minami-ashigara (JP); Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/199,669

(22) Filed: Mar. 12, 2021

(65) Prior Publication Data
US 2021/0287711 A1    Sep. 16, 2021

(30) Foreign Application Priority Data
Mar. 13, 2020    (JP) ............................. JP2020-044604

(51) Int. Cl.
*G11B 5/70*    (2006.01)
*G11B 5/706*    (2006.01)

(52) U.S. Cl.
CPC ................. *G11B 5/70642* (2013.01)

(58) Field of Classification Search
None
See application file for complete search history.

(56) References Cited

U.S. PATENT DOCUMENTS

| | | | | |
|---|---|---|---|---|
| 2007/0230054 A1* | 10/2007 | Takeda | ................. | G11B 5/7368 360/134 |
| 2007/0231611 A1* | 10/2007 | Masaki | ................. | G11B 5/733 428/840.2 |
| 2008/0318087 A1* | 12/2008 | Hattori | ................. | G11B 5/855 428/840 |
| 2010/0171066 A1* | 7/2010 | Ohkoshi | ............. | C01G 45/006 252/62.57 |
| 2014/0287270 A1* | 9/2014 | Suzuki | ............. | G11B 5/70678 428/842.8 |
| 2016/0203894 A1* | 7/2016 | Shirata | ................. | G11B 5/714 428/836.2 |
| 2016/0217817 A1* | 7/2016 | Masada | ............. | G11B 5/70678 |

(Continued)

FOREIGN PATENT DOCUMENTS

| | | |
|---|---|---|
| JP | 2018-170054 A | 11/2018 |
| JP | 2019-001663 A | 1/2019 |

(Continued)

OTHER PUBLICATIONS

Office Action dated Sep. 29, 2021 in U.S. Appl. No. 17/196,376.

(Continued)

*Primary Examiner* — William J Klimowicz
(74) *Attorney, Agent, or Firm* — Sughrue Mion, PLLC

(57) ABSTRACT

The magnetic tape includes a non-magnetic support and a magnetic layer including ferromagnetic powder, in which the ferromagnetic powder is ε-iron oxide powder, and a coefficient of variation of particle size of the ε-iron oxide powder in a longitudinal direction of the magnetic layer is 0.50% or more and 5.00% or less.

19 Claims, 1 Drawing Sheet

(56) References Cited

U.S. PATENT DOCUMENTS

| | | |
|---|---|---|
| 2017/0004912 A1* | 1/2017 | Shirata .................. C01G 49/06 |
| 2017/0069344 A1* | 3/2017 | Hosoya ............. G11B 5/70678 |
| 2017/0092314 A1* | 3/2017 | Mori ........................ G11B 5/70 |
| 2018/0170767 A1 | 6/2018 | Ohkoshi et al. |
| 2018/0208479 A1* | 7/2018 | Sakane .................. G11B 5/714 |
| 2018/0286451 A1 | 10/2018 | Ozawa et al. |
| 2018/0358155 A1* | 12/2018 | Naoi .................... H01F 1/0054 |
| 2018/0374506 A1 | 12/2018 | Kasada |
| 2019/0074032 A1* | 3/2019 | Mori ..................... G11B 5/733 |
| 2019/0228800 A1* | 7/2019 | Muramatsu ........ G11B 5/70678 |
| 2019/0228889 A1* | 7/2019 | Yamaga .................... H01F 1/11 |
| 2019/0295584 A1 | 9/2019 | Terakawa et al. |
| 2020/0082963 A1* | 3/2020 | Suetsuna ............. H01F 1/14741 |
| 2020/0279582 A1* | 9/2020 | Fujimoto ............. G11B 5/8404 |
| 2020/0312360 A1* | 10/2020 | Imaoka ............. G11B 5/70678 |
| 2020/0312363 A1* | 10/2020 | Naoi .................... G11B 5/7356 |
| 2021/0027807 A1* | 1/2021 | Toyosawa ................. H01F 1/11 |
| 2021/0287709 A1 | 9/2021 | Fujimoto et al. |
| 2021/0287714 A1* | 9/2021 | Muramatsu ........... H01F 1/0045 |
| 2021/0300779 A1 | 9/2021 | Ohkoshi et al. |

FOREIGN PATENT DOCUMENTS

| | | |
|---|---|---|
| JP | 2019-175539 A | 10/2019 |
| JP | 6662488 B1 | 3/2020 |
| WO | 2008/149785 A1 | 12/2008 |
| WO | 2018/074162 A1 | 4/2018 |
| WO | WO 2018/062478 A1 | 4/2018 |
| WO | 2018/116713 A1 | 6/2018 |

OTHER PUBLICATIONS

Wikipedia Article on Particle Size, obtained on Sep. 20, 2021 (4 pages total).

17/196,376, Pending.

Office Action dated May 11, 2022 in U.S. Appl. No. 17/196,376.

Office Action dated Mar. 14, 2023 issued in Japanese patent application No. 2020-044605, corresponding to U.S. Appl. No. 17/196,376.

Office Action dated Mar. 14, 2023 issued in corresponding Japanese patent application No. 2020-044604.

* cited by examiner

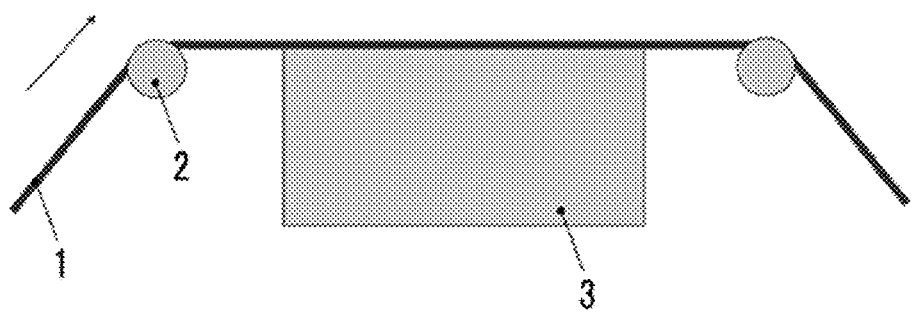

MAGNETIC TAPE HAVING CHARACTERIZED COEFFICIENT OF VARIATION OF E-IRON OXIDE POWDER PARTICLE SIZE, MAGNETIC TAPE CARTRIDGE, AND MAGNETIC RECORDING AND REPRODUCING APPARATUS

CROSS-REFERENCE TO RELATED APPLICATIONS

This application claims priority under 35 U.S.C 119 to Japanese Patent Application No. 2020-014604 filed on Mar. 13, 2020. The above application is hereby expressly incorporated by reference, in its entirety, into the present application.

BACKGROUND OF THE INVENTION

1. Field of the Invention

The present invention relates to a magnetic tape, a magnetic tape cartridge, and a magnetic recording and reproducing apparatus.

2. Description of the Related Art

In recent years, ε-iron oxide powder has attracted attention as ferromagnetic powder used in a magnetic recording medium (see, for example, WO2018/062478A).

SUMMARY OF THE INVENTION

The magnetic recording medium is required to have further improved electromagnetic conversion characteristics in order to enable even higher capacity.

There are two types of magnetic recording media: a tape shape and a disk shape, and a tape-shaped magnetic recording medium, that is, a magnetic tape is mainly used for storage applications such as data backup and archiving.

The magnetic tape is usually accommodated in a magnetic tape cartridge in a state of being wound around a reel. Recording of data on the magnetic tape and reproducing of recorded data are usually performed by setting the magnetic tape cartridge in a magnetic recording and reproducing apparatus called a drive, and running the magnetic tape in the magnetic recording and reproducing apparatus to bring a magnetic tape surface (magnetic layer surface) and a magnetic head into contact with each other to be slid on each other. Here, it is desirable to improve running stability of the magnetic tape from a viewpoint of suppressing occurrence of errors in recording and/or reproducing of data.

On the other hand, ε-iron oxide powder is considered to be ferromagnetic powder desirable for higher recording density. However, according to the study of the present inventor, it is not easy to improve both electromagnetic conversion characteristics and running stability in a magnetic tape including ε-iron oxide powder.

An aspect of the present invention is to provide a magnetic tape including ε-iron oxide powder as ferromagnetic powder and having excellent electromagnetic conversion characteristics and running stability.

An aspect of the present invention relates to a magnetic tape comprising a non-magnetic support and a magnetic layer including ferromagnetic powder, in which the ferromagnetic powder is ε-iron oxide powder, and a coefficient of variation of particle size of the ε-iron oxide powder in a longitudinal direction of the magnetic layer is 0.50% or more and 5.00% or less.

The coefficient of variation of particle size is determined according to the following expression by obtaining an average particle size d of ε-iron oxide powder at each of 50 locations at an interval of 10 cm in the longitudinal direction of the magnetic layer and then obtaining an arithmetic average dA and a standard deviation dD of values of the obtained 50 average particle sizes d's.

$$\text{Coefficient of variation of particle size} = (dD/dA) \times 100$$

A method of measuring the particle size d and the like will be described below.

In one embodiment, the arithmetic average dA may be 5.0 nm or more and 20.0 nm or less.

In one embodiment, the arithmetic average dA may be 5.0 nm or more and 15.0 nm or less.

In one embodiment, the coefficient of variation of particle size may be 0.55% or more and 4.60% or less.

In one embodiment, the ε-iron oxide powder may include one or more elements selected from the group consisting of a gallium element, a cobalt element, and a titanium element.

In one embodiment, the magnetic tape may further comprise a non-magnetic layer including non-magnetic powder between the non-magnetic support and the magnetic layer.

In one embodiment, the magnetic tape may further comprise a back coating layer including non-magnetic powder on a surface side of the non-magnetic support opposite to a surface side having the magnetic layer.

Another aspect of the present invention relates to a magnetic tape cartridge including the magnetic tape described above.

Still another aspect of the present invention relates to a magnetic recording and reproducing apparatus including the magnetic tape described above.

According to one aspect of the present invention, it is possible to provide a magnetic tape including ε-iron oxide powder as ferromagnetic powder and having excellent electromagnetic conversion characteristics and running stability. In addition, according to one aspect of the present invention, it is possible to provide a magnetic tape cartridge and a magnetic recording and reproducing apparatus which include the magnetic tape.

BRIEF DESCRIPTION OF THE DRAWINGS

FIG. 1 is a schematic configuration diagram of a vibration applying device used in examples.

DESCRIPTION OF THE PREFERRED EMBODIMENTS

Magnetic Tape

An aspect of the present invention relates to a magnetic tape including a non-magnetic support and a magnetic layer including ferromagnetic powder. The ferromagnetic powder is ε-iron oxide powder, and a coefficient of variation of particle size of the ε-iron oxide powder in a longitudinal direction of the magnetic layer is 0.50% or more and 5.00% or less.

In the present invention and this specification, the "powder" means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described below is interposed between the particles. The term "particle" is used to describe powder in some cases. In the present invention and this specification, the "magnetic layer surface (surface of the magnetic layer)" has the same meaning as a surface of the magnetic tape on a magnetic layer side.

The coefficient of variation of particle size is obtained by the following method using a scanning electron microscope (SEM). As the scanning electron microscope, a field emission-scanning electron microscope (FE-SEM) is used. As an SEM image, a secondary electron image is acquired. As the FE-SEM, for example, SU8220 manufactured by Hitachi High-Tech Corporation can be used, and in examples described below, this FE-SEM was used.

50 sample pieces are cut out from any region of a magnetic tape to be measured at an interval of 10 cm in a longitudinal direction. A width of each sample piece is a width of the magnetic tape from which the sample piece is cut out. For example, a width of a sample piece cut out from a magnetic tape having a width of ½ inches is ½ inches. ½ inches=1.27 cm. A length of each sample piece is 3 cm. That is, in any region of the magnetic tape to be measured, after cutting out a sample piece having a length of 3 cm, cutting out another sample piece having a length of 3 cm from a position separated by 10 cm in a longitudinal direction is repeated to obtain a total of 50 sample pieces.

A magnetic layer surface of each sample piece is subjected to a well-known coating treatment as a pretreatment for suppressing charge-up in a scanning electron microscope. For specific examples of the coating treatment, a coating treatment in examples described below can be referred to.

After the above pretreatment, a randomly selected region (size: 300 nm×300 nm) to be observed on the pretreated surface of each sample piece is imaged by a scanning electron microscope (SEM) to obtain an SEM image (acceleration voltage: 2.0 kV, imaging magnification: 200,000 times). The acquired SEM image is printed on printing paper or displayed on a display. In each SEM image, the particle size of 500 particles randomly selected from particles of ε-iron oxide powder whose whole particle outline is shown in the SEM image is obtained by the following method. The fact that the particles are particles of ε-iron oxide powder is easily identifiable in the SEM image from the particle shape and size.

In the SEM image, target particles are selected and the outlines of the particles (primary particle) are traced by a digitizer. The primary particle is an independent particle which is not aggregated. The size of the particles whose outlines are traced can be obtained by using well-known image analysis software. Examples of the image analysis software include image analysis software KS-400 manufactured by Carl Zeiss, and in examples described below, this image analysis software was used. An area of the region within the traced outline is calculated by image analysis software. An equivalent circle diameter obtained from the calculated area is defined as the particle size of particles of ε-iron oxide powder. The equivalent circle diameter (unit: nm) is expressed to one decimal place, rounded off to one decimal place, and rounded down to two decimal places. The same applies to a case of calculating an arithmetic average of the particle size in each of the sample pieces described below and a case of calculating an arithmetic average dA described below. A standard deviation dD (unit: nm) described below is calculated as a positive square root of variance, expressed to three decimal places, rounded off to three decimal places, and rounded down to four decimal places.

An arithmetic average of the particle size values obtained for 500 particles as described above is defined as an average particle size d of ε-iron oxide powder in the sample piece. An arithmetic average dA and a standard deviation dD of the values of d obtained for 50 sample pieces are calculated, and the coefficient of variation of particle size (unit: %) is obtained by the following expression from the calculated dA and dD.

Coefficient of variation of particle size=$(dD/dA) \times 100$

The coefficient of variation of particle size is expressed to two decimal places, rounded off to two decimal places, and rounded down to three decimal places.

The above measurement is performed with respect to particles of ε-iron oxide powder present in the magnetic layer of the magnetic tape. On the other hand, in the present invention and this specification, an average particle size of various kinds of powder used for manufacturing the magnetic tape or various kinds of powder collected from the magnetic tape is a value measured by the following method using a transmission electron microscope unless otherwise noted.

The powder is imaged at an imaging magnification of 100,000 with a transmission electron microscope, and the image is printed on printing paper, is displayed on a display, or the like so that the total magnification ratio is 500,000 to obtain an image of particles configuring the powder. A target particle is selected from the obtained image of particles, an outline of the particle is traced with a digitizer, and a size of the particle (primary particle) is measured.

The measurement described above is performed regarding 500 particles randomly extracted. An arithmetic average of the particle sizes of 500 particles thus obtained is an average particle size of the powder.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size of various kinds of powder shown in examples which will be described below is a value measured by using a transmission electron microscope H-9000 manufactured by Hitachi High-Tech Corporation as the transmission electron microscope, and image analysis software KS-400 manufactured by Carl Zeiss as the image analysis software, unless otherwise noted.

As a method of taking sample powder from the magnetic tape in order to measure the particle size, a method disclosed in a paragraph 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

Coefficient of Variation of Particle Size of ε-Iron Oxide Powder in Longitudinal Direction of Magnetic Layer In the above magnetic tape, the coefficient of variation of particle size of the ε-iron oxide powder in the longitudinal direction of the magnetic layer obtained by the method described above is 0.50% or more and 5.00% or less. The coefficient of variation of particle size of 5.00% or less can contribute to improvement of electromagnetic conversion characteristics. The present inventor considers that such improvement of electromagnetic conversion characteristics is brought about by the fact that the variation in signal strength in the longitudinal direction of the magnetic tape can be reduced during data reproduction in a case where the coefficient of variation of particle size is 5.00% or less. From this point, the coefficient of variation of particle size is 5.00% or less, preferably 4.90% or less, more preferably 4.80% or less, still more preferably 4.70% or less, still more preferably 4.60% or less, still more preferably 4.50% or less, still more preferably 4.40% or less, still more preferably 4.30% or less, still more preferably 4.20% or less, still more preferably 4.10% or less, and still more preferably 4.00% or less. In addition, in the magnetic tape, the coefficient of variation of particle size of 0.50% or more can contribute to improvement of running stability. It is supposed that this is because the presence of particles of ε-iron oxide powder in the magnetic layer in the longitudinal direction with an appropriate particle size variation causes an extremely fine unevenness on the surface of the magnetic layer, and this unevenness contributes to suppression of occurrence of deviation in width direction of the magnetic tape in a case where the magnetic tape runs while repeating feeding and winding in a magnetic recording and reproducing apparatus. From this point, the coefficient of variation of particle size is 0.50% or more, preferably 0.51% or more, more preferably 0.52% or more, still more preferably 0.53% or more, still more preferably 0.54% or more, still more preferably 0.55% or more, still more preferably 0.56% or more, still more preferably 0.57% or more, still more preferably 0.58% or more, still more preferably 0.59% or more, and still more preferably 0.60% or more.

Controlling of the presence state of particles of ε-iron oxide powder included in the magnetic layer of the magnetic tape as described above is a knowledge newly found by the present inventor, which is not disclosed in WO2018/062478A described above and the like. The above and the following include supposition of the present inventor. The present invention is not limited to such supposition.

The coefficient of variation of particle size can be controlled by manufacturing conditions of ε-iron oxide powder, manufacturing conditions of the magnetic tape, and the like. Details will be described below.

Arithmetic Average dA and Standard Deviation dD

In the above magnetic tape, the values of the arithmetic average dA and the standard deviation dD are not particularly limited as long as the coefficient of variation of particle size of ε-iron oxide powder in the longitudinal direction of the magnetic layer, which is obtained by the method described above is within the above range. From a viewpoint of magnetization stability, the arithmetic average dA is preferably 5.0 nm or more, more preferably 6.0 nm or more, still more preferably 7.0 nm or more, still more preferably 8.0 nm or more, and still more preferably 9.0 nm or more. In addition, from a viewpoint of high density recording, the arithmetic average dA is preferably 20.0 nm or less, more preferably 19.0 nm or less, still more preferably 18.0 nm or less, still more preferably 17.0 nm or less, still more preferably 16.0 nm or less, and still more preferably 15.0 nm or less. For example, the standard deviation dD may be 0.030 nm or more, 0.040 nm or more, or 0.050 nm or more, and may be 0.800 nm or less, 0.700 nm or less, or 0.600 nm or less.

Hereinafter, the magnetic tape will be described more specifically.

Magnetic Layer

ε-Iron Oxide Powder

The magnetic tape includes ε-iron oxide powder as ferromagnetic powder of the magnetic layer. In the present invention and this specification, "ε-iron oxide powder" refers to ferromagnetic powder in which an ε-iron oxide type crystal structure (s phase) is detected as a main phase by X-ray diffraction analysis. For example, in a case where the highest intensity diffraction peak is attributed to an ε-iron oxide type crystal structure (s phase) in an X-ray diffraction spectrum obtained by X-ray diffraction analysis, it is determined that the ε-iron oxide type crystal structure is detected as the main phase. In addition to the s phase of the main phase, an a phase and/or a γ phase may or may not be included. ε-Iron oxide powder in the present invention and this specification includes so-called non-substitution type ε-iron oxide powder composed of iron and oxygen, and so-called substitution type ε-iron oxide powder including one or more substituent elements substituting for iron.

Method of Manufacturing ε-Iron Oxide Powder

As a method of manufacturing ε-iron oxide powder, a producing method from a goethite, a reverse micelle method, and the like are known. All of the manufacturing methods are well known. Regarding a method of manufacturing ε-iron oxide powder in which a part of iron is substituted with substituent elements, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example.

As an example, ε-iron oxide powder included in a magnetic layer of the magnetic tape can be obtained, for example, by a manufacturing method of obtaining ε-iron oxide powder by preparing a precursor of ε-iron oxide (hereinafter, referred to as a "precursor preparation process"), subjecting the precursor to a coat-forming treatment (hereinafter, referred to as a "coat-forming process"), subjecting the precursor having undergone the coat-forming treatment to a heat treatment, thereby converting the precursor to ε-iron oxide (hereinafter, referred to as a "heat treatment process"), and subjecting the ε-iron oxide to a coat-removing treatment (hereinafter, referred to as a "coat-removing process"). The manufacturing method will be further described below. However, the manufacturing method described below is merely an example, and the ε-iron oxide powder is not limited to those manufactured by the manufacturing method exemplified below.

Precursor Preparation Process

A precursor of ε-iron oxide refers to a substance that includes an ε-iron oxide type crystal structure as a main phase by being heated. The precursor can be, for example, a hydroxide, an oxyhydroxide (oxide hydroxide), or the like containing iron and an element capable of substituting for a part of iron in a crystal structure. The precursor preparation process can be performed by using a coprecipitation method, a reverse micelle method, or the like. A method of preparing such a precursor is well-known, and the precursor preparation process in the above-described manufacturing method can be performed by a well-known method. For example, for the method of preparing the precursor, well-known technology such as paragraphs 0017 to 0021 of JP2008-174405A and examples thereof, paragraphs 0025 to 0046 of WO2016/047559A1 and examples thereof, paragraphs 0038 to 0040, 0042, 0044, and 0045 of WO2008/149785A1 and examples thereof can be referred to.

ε-Iron oxide, which does not include a substituent element substituting for a part of iron (Fe), can be represented by a compositional formula of $Fe_2O_3$. On the other hand, ε-iron oxide in which a part of iron is substituted with, for example, one to three kinds of elements can be represented by a compositional formula of $A^1_x A^2_y A^3_z Fe_{(2-x-y-z)}O_3$. $A^1$, $A^2$, and $A^3$ each independently represent a substituent element substituting for iron, and x, y, and z are each independently 0 or more and less than 2, where at least one is more than 0 and x+y+z is less than 2. The ε-iron oxide powder may or may not include a substituent element substituting for iron, and preferably includes a substituent element. Magnetic properties of ε-iron oxide powder can be adjusted by a type and a substitution amount of a substituent element. In a case where a substituent element is included, the substituent element may include one or more of Ga, Al, In, Rh, Mn, Co, Ni, Zn, Ti, Sn, and the like. For example, in the above compositional formula, $A^1$ may be one or more selected from the group consisting of Ga, Al, In, and Rh, and $A^2$ may be one or more selected from the group consisting of Mn, Co, Ni, and Zn, and $A^3$ may be one or more selected from the group consisting of Ti and Sn. As the substituent element, one or more selected from the group consisting of Ga, Co, and Ti are preferable. In a case where ε-iron oxide powder including a substituent element substituting for iron is manufactured, a part of a compound serving as a supply source of iron in ε-iron oxide need only be substituted with a compound of the substituent element. The composition of ε-iron oxide powder obtained can be controlled by the substitution amount of the compound. Examples of the compound serving as a supply source of iron and various substituent elements include an inorganic salt (which may be a hydrate) such as a nitrate, a sulfate, and a chloride, an organic salt (which may be a hydrate) such as a pentakis (hydrogen oxalate) salt, a hydroxide, an oxyhydroxide, and the like.

Coat-Forming Process

In a case where the precursor is heated after the coat-forming treatment, reaction can proceed by which the precursor is converted to ε-iron oxide under the coat. It is considered that the coat can play a role of preventing sintering from occurring during heating. From a viewpoint of ease of forming the coat, the coat-forming treatment is preferably performed in a solution, and more preferably performed by adding a coat-forming agent (compound for forming a coat) to a solution including the precursor. For example, in a case where the coat-forming treatment is performed in the same solution after the preparation of the precursor, by adding the coat-forming agent to the solution after the preparation of the precursor and stirring the solution, a coat can be formed on the precursor. As the coat, for example, a silicon-containing coat is preferable because the coat is easily formed on the precursor in the solution. Examples of the coat-forming agent for forming the silicon-containing coat include a silane compound such as alkoxysilane. Through hydrolysis of the silane compound, a silicon-containing coat can be formed on the precursor, preferably using a sol-gel method. Specific examples of the silane compound include tetraethoxysilane (tetraethyl orthosilicate; TEOS), tetramethoxysilane, and various silane coupling agents. For the coat-forming treatment, for example, well-known technology such as a paragraph 0022 of JP2008-174405A and examples thereof, paragraphs 0047 to 0049 of WO2016/047559A1 and examples thereof, paragraphs 0041 and 0043 of WO2008/149785A1 and examples thereof can be referred to. For example, the coat-forming treatment can be performed by stirring a solution including a precursor and a coat-forming agent at a liquid temperature of 50° C. to 90° C. for about 5 to 36 hours. The coat may cover the entire surface of the precursor, or a part of the surface of the precursor may not be covered with the coat.

Heat Treatment Process

By performing a heat treatment on the precursor having undergone the coat-forming treatment, the precursor can be converted to ε-iron oxide. The heat treatment can be performed on, for example, powder (powder of the precursor having the coat) collected from the solution in which the coat-forming treatment is performed. For the heat treatment process, for example, well-known technology such as a paragraph 0023 of JP2008-174405A and examples thereof, a paragraph 0050 of WO2016/047559A1 and examples thereof, paragraphs 0041 and 0043 of WO2008/149785A1 and examples thereof can be referred to. The heat treatment process can be performed, for example, in a heat treatment furnace having a furnace temperature of 900° C. to 1200° C. for about 3 to 6 hours. The higher the temperature of the heat treatment process and/or the longer the heat treatment time, the larger the average particle size of the ε-iron oxide powder obtained tends to be.

Coat-Removing Process

By performing the heat treatment process, the precursor having the coat can be converted to ε-iron oxide. Since the coat remains on the ε-iron oxide thus obtained, a coat-removing treatment is preferably performed. For the coat-removing treatment, for example, well-known technology such as a paragraph 0025 of JP2008-174405A and examples thereof, a paragraph 0053 of WO2008/149785A1 and examples thereof can be referred to. The coat-removing treatment can be performed, for example, by stirring ε-iron oxide having the coat in a sodium hydroxide aqueous solution having a concentration of about 1 to 5 mol/L and a liquid temperature of about 60° C. to 90° C. for about 5 to 36 hours. Here, the ε-iron oxide powder included in the magnetic layer of the magnetic tape may be manufactured without performing the coat-removing treatment, or may be such that the coat is not completely removed by the coat-removing treatment and a part of the coat remains.

Well-known processes can be optionally performed before and/or after the various processes described above. Examples of such processes include various well-known processes such as classification, filtration, washing, and drying. For example, classification can be performed by a well-known classification treatment such as centrifugal separation, decantation, or magnetic separation. For example, after centrifugal separation, among particles having various particle sizes, particles having a larger particle size are likely to be sedimented, and particles having a smaller particle size are likely to be dispersed in a supernatant liquid. Therefore, for example, in a case where it is desired to remove particles having a smaller particle size, it is preferable to remove a supernatant liquid after centrifugal separation to recover a sediment. On the other hand, for example, in a case where it is desired to remove particles having a larger particle size, it is preferable to remove a sediment after centrifugal separation to recover a supernatant liquid. Examples of the classification conditions include the number of times and treatment time of classification, and a centrifugal force applied in the centrifugal separation, and in the magnetic separation, a generated magnetic field intensity and, in a case of using an AC magnetic field, a frequency of the AC magnetic field. By adjusting one or more of these classification conditions, the particle size distribution of ε-iron oxide powder used for forming the magnetic layer can be adjusted. Adjustment of the particle size distribution in this way can be taken as an example of means for controlling the coefficient of variation of particle size in the longitudinal direction of the magnetic layer.

Average Particle Size

For the ε-iron oxide powder used for forming the magnetic layer or the ε-iron oxide powder taken from the magnetic layer of the magnetic tape, from a viewpoint of stability of magnetization, an average particle size is preferably 5.0 nm or more, more preferably 6.0 nm or more, still more preferably 7.0 nm or more, still more preferably 8.0 nm or more, and still more preferably 9.0 nm or more. In addition, from a viewpoint of high density recording, an average particle size of the ε-iron oxide powder is preferably 20.0 nm or less, more preferably 19.0 nm or less, still more preferably 18.0 nm or less, still more preferably 17.0 nm or less, still more preferably 16.0 nm or less, and still more preferably 15.0 nm or less.

The content (filling percentage) of the ferromagnetic powder of the magnetic layer is preferably in a range of 50 to 90 mass % and more preferably in a range of 60 to 90 mass %. A high filling percentage of the ferromagnetic powder in the magnetic layer is preferable from a viewpoint of improvement of recording density.

Binding Agent

The above-described magnetic tape may be a coating type magnetic tape, and may include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the above binding agent, descriptions disclosed in paragraphs 0028 to 0031 of JP2010-024113A can be referred to. In addition, the binding agent may be a radiation curable resin such as an electron beam curable resin. For the radiation curable resin, descriptions disclosed in paragraphs 0044 and 0045 of JP2011-048878A can be referred to. An average molecular weight of the resin used as the binding agent can be, for example, 10,000 or more and 200,000 or less as a weight-average molecular weight. The weight-average molecular weight of the present invention and this specification is a value obtained by performing polystyrene conversion of a value measured by gel permeation chromatography (GPC) under the following measurement conditions. A weight-average molecular weight of a binding agent shown in examples to be described below is a value obtained by performing polystyrene conversion of a value measured under the following measurement conditions. The binding agent can be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

A curing agent can also be used together with the resin which can be used as the binding agent. As the curing agent, in an aspect, a thermosetting compound which is a compound in which a curing reaction (crosslinking reaction) is progressed due to heating can be used, and in another aspect, a photocurable compound in which a curing reaction (crosslinking reaction) is progressed due to light irradiation can be used. Curing reaction proceeds in a magnetic layer forming process, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent may be used in a magnetic layer forming composition in an amount of, for example, 0 to 80.0 parts by mass, and preferably 50.0 to 80.0 parts by mass from a viewpoint of improving a strength of the magnetic layer, with respect to 100.0 parts by mass of the binding agent.

The above description regarding the binding agent and the curing agent can also be applied to a non-magnetic layer and/or a back coating layer. In this case, the above description regarding the content can be applied by replacing the ferromagnetic powder with non-magnetic powder.

Additive

The magnetic layer may include one or more kinds of additives, as necessary. As the additives, the curing agent described above is used as an example. In addition, examples of the additive which can be included in the magnetic layer include non-magnetic powder (for example, inorganic powder or carbon black), a lubricant, a dispersing agent, a dispersing assistant, an antibacterial agent, an antistatic agent, an antioxidant, and the like. For example, for the lubricant, descriptions disclosed in paragraphs 0030 to 0033, 0035, and 0036 of JP2016-126817A can be referred to. The non-magnetic layer described below may include a lubricant. For the lubricant which may be included in the non-magnetic layer, descriptions disclosed in paragraphs 0030, 0031, and 0034 to 0036 of JP2016-126817A can be referred to. For the dispersing agent, descriptions disclosed in paragraphs 0061 and 0071 of JP2012-133837A can be referred to. The use of the dispersing agent, adjustment of the dispersion conditions, or the like can be exemplified as means for controlling the coefficient of variation of particle size in the longitudinal direction of the magnetic layer. A dispersing agent may be added to the non-magnetic layer forming composition. For the dispersing agent that can be added to the non-magnetic layer forming composition, a description disclosed in paragraph 0061 of JP2012-133837A can be referred to. As the non-magnetic powder that can be included in the magnetic layer, non-magnetic powder which can function as an abrasive, or non-magnetic powder which can function as a protrusion forming agent which forms protrusions suitably protruded from the magnetic layer surface (for example, non-magnetic colloidal particles) is used. An average particle size of colloidal silica (silica colloidal particle) shown in examples described below is a value obtained by a method disclosed in a paragraph 0015 of JP2011-048878A as a method for measuring an average particle diameter. As the additive, a commercially available product can be suitably selected or manufactured by a well-known method according to the desired properties, and any amount thereof can be used. Examples of the additive that can be used to improve the dispersibility of the abrasive in the magnetic layer containing the abrasive include a dispersing agent disclosed in paragraphs 0012 to 0022 of JP2013-131285A.

The magnetic layer described above can be provided directly on a surface of the non-magnetic support or indirectly through the non-magnetic layer.

Non-Magnetic Layer

Next, the non-magnetic layer will be described. The above magnetic tape may have a magnetic layer directly on the surface of the non-magnetic support, or may have a magnetic layer on the surface of the non-magnetic support through a non-magnetic layer including non-magnetic powder. Non-magnetic powder used for the non-magnetic layer may be inorganic powder or organic powder. In addition, carbon black and the like can be used. Examples of the inorganic powder include powder such as metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50 to 90 mass % and more preferably in a range of 60 to 90 mass %.

The non-magnetic layer can include a binding agent, and can also include an additive. In regards to other details of a binding agent or an additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

In the present invention and this specification, the non-magnetic layer also includes a substantially non-magnetic layer including a small amount of ferromagnetic powder as impurities, for example, or intentionally, together with the non-magnetic powder. Here, the substantially non-magnetic layer is defined as a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Non-Magnetic Support

Next, the non-magnetic support will be described. Examples of the non-magnetic support (hereinafter, simply referred to as a "support") include well-known components such as polyethylene terephthalate, polyethylene naphthalate, polyamide, polyamideimide, and aromatic polyamide subjected to biaxial stretching. Among these, polyethylene terephthalate, polyethylene naphthalate, and polyamide are preferable. A corona discharge, a plasma treatment, an easy-bonding treatment, or a thermal treatment may be performed with respect to these supports in advance.

Back Coating Layer

The magnetic tape may have a back coating layer including non-magnetic powder on a surface side of the non-magnetic support opposite to a surface side having the magnetic layer. Preferably, the back coating layer contains one or both of carbon black and inorganic powder. The back coating layer can include a binding agent, and can also include an additive. In regards to the binding agent and the additive of the back coating layer, the well-known technology regarding the back coating layer can be applied, and the well-known technology regarding the list of components of the magnetic layer and/or the non-magnetic layer can be applied. For example, for the back coating layer, descriptions disclosed in paragraphs 0018 to 0020 of JP2006-331625A and column 4, line 65 to column 5, line 38 of U.S. Pat. No. 7,029,774B can be referred to.

Various Thicknesses

A thickness of the non-magnetic support is, for example, 3.0 to 80.0 μm, preferably 3.0 to 20.0 μm, and more preferably 3.0 to 10.0 μm.

A thickness of the magnetic layer can be optimized according to a saturation magnetization amount, a head gap length, and a band of a recording signal of the used magnetic head, and is generally 0.01 μm to 0.15 μm, and from a viewpoint of high density recording, is preferably 0.02 μm to 0.12 μm, and more preferably 0.03 μm to 0.1 μm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less, and more preferably 0.1 to 0.7 μm.

Thicknesses of each layer and the non-magnetic support of the magnetic tape can be obtained by a well-known film thickness measurement method. As an example, a cross section of the magnetic tape in a thickness direction is exposed by a well-known method such as an ion beam or a microtome, and then the exposed cross section observation is performed using a transmission electron microscope or a scanning electron microscope, for example. In the cross section observation, various thicknesses can be obtained as a thickness obtained at one portion of the cross section, or an arithmetic average of thicknesses obtained at a plurality of portions of two or more portions which are randomly extracted.

Manufacturing Process

A process of preparing a composition for forming a magnetic layer, a non-magnetic layer, or a back coating layer usually includes at least a kneading process, a dispersing process, and a mixing process provided before and after these processes as necessary. Each process may be divided into two or more stages. Components used for the preparation of each layer forming composition may be added at an initial stage or in a middle stage of each process. As a solvent, one kind or two or more kinds of various solvents generally used for manufacturing a coating type magnetic recording medium can be used. For the solvent, for example, a description disclosed in a paragraph 0153 of JP2011-216149A can be referred to. In addition, each component may be separately added in two or more processes. For example, a binding agent may be added separately in a kneading process, a dispersing process, and a mixing process for adjusting a viscosity after dispersion. In order to manufacture the magnetic tape, a well-known manufacturing technology can be used in various processes. In the kneading process, preferably, a kneader having a strong kneading force such as an open kneader, a continuous kneader, a pressure kneader, or an extruder is used. For details of the kneading treatment, descriptions disclosed in JP1989-106338A (JP-H01-106338A) and JP1989-079274A (JP-H01-079274A) can be referred to. As a dispersing device, a well-known dispersing device can be used. For example, in the preparation of the magnetic layer forming composition, from a viewpoint of improving the dispersibility of the ε-iron oxide powder, it is preferable to prepare a magnetic layer forming composition by preparing a dispersion liquid (hereinafter, referred to as a "magnetic liquid") including the ε-iron oxide powder and a solvent separately from a dispersion liquid including non-magnetic powder, and then mixing the dispersion liquid including the non-magnetic powder with the magnetic liquid. The higher the dispersibility of the ε-iron oxide powder in the magnetic layer forming composition, the smaller the value of the coefficient of variation of particle size in the longitudinal direction of the magnetic layer tends to be. Therefore, adjustment of the dispersion conditions can be taken as an example of means for controlling the coefficient of variation of particle size in the longitudinal direction of the magnetic layer. The dispersion state of the ε-iron oxide powder in the magnetic liquid and the magnetic layer forming composition can be adjusted by the use or non-use of a dispersing agent, the treatment conditions (dispersion time, bead diameter, and the like) of a dispersion treatment such as bead dispersion, and the like. These dispersion conditions are not particularly limited, and need only be set so that the coefficient of variation of particle size in the longitudinal direction of the magnetic layer can be controlled. In addition, in any stage of preparing each layer forming composition, filtering may be performed by a well-known method. The filtering can be performed by using a filter, for example. As the filter used in the filtering, a filter having a pore diameter of 0.01 to 3 μm (for example, filter made of glass fiber or filter made of polypropylene) can be used, for example.

The magnetic layer can be formed, for example, by directly applying the magnetic layer forming composition onto the non-magnetic support or performing multilayer applying of the magnetic layer forming composition with the non-magnetic layer forming composition in order or at the same time. The back coating layer can be formed by applying the back coating layer forming composition onto a side of the non-magnetic support opposite to a side having the magnetic layer (or to be provided with the magnetic layer). For details of application for forming each layer, for example, a description disclosed in a paragraph 0051 of JP2010-024113A can be referred to.

The application of the magnetic layer forming composition is usually performed by applying the magnetic layer forming composition onto the surface of a long running non-magnetic support (or a non-magnetic layer formed on the non-magnetic support) while running the non-magnetic support. Here, applying vibration to the non-magnetic support during running and adjusting the vibration applying condition can be exemplified as an example of means for controlling the coefficient of variation of particle size in the longitudinal direction of the magnetic layer. Thus, it is considered that, by applying vibration to the non-magnetic support and adjusting the vibration applying conditions, a coating layer formed by applying the magnetic layer forming composition onto the non-magnetic support can be vibrated to adjust the presence state of particles of ε-iron oxide powder in the coating layer.

The vibration applying means is not particularly limited. For example, by bringing the surface of the non-magnetic support opposite to the surface onto which the magnetic layer forming composition is applied (or coated with the magnetic layer forming composition) into contact with a vibration applying unit, the application of the magnetic layer forming composition can be performed while applying vibration to the non-magnetic support. The vibration applying unit can apply vibration to an article in contact with the unit, for example, by providing an ultrasonic vibrator inside the unit. Examples of the vibration applying conditions include an ultrasonic frequency and intensity of the ultrasonic vibrator, a contact time with the vibration applying unit, and the like. For example, the contact time can be adjusted by a running speed during contact of the non-magnetic support with the vibration applying unit. These vibration applying conditions are not particularly limited, and need only be set so that the coefficient of variation of particle size in the longitudinal direction of the magnetic layer can be controlled.

After the coating process, various treatments such as a drying treatment, an orientation treatment of the magnetic layer, and a surface smoothing treatment (calendering treatment) can be performed. For the various processes, for example, well-known technology such as paragraphs 0052 to 0057 of JP2010-024113A can be referred to. For example, a coating layer of the magnetic layer forming composition is preferably subjected to an orientation treatment while the coating layer is in a wet state. For the orientation treatment, the various well-known technologies such as descriptions disclosed in a paragraph 0067 of JP2010-231843A can be used. For example, a vertical orientation treatment can be performed by a well-known method such as a method using a polar opposing magnet. In an orientation zone, a drying speed of the coating layer can be controlled depending on a temperature and a flow rate of dry air and/or a running speed in the orientation zone of the non-magnetic support on which the coating layer of the magnetic layer forming composition is formed. Further, the coating layer may be preliminarily dried before the transportation to the orientation zone.

The magnetic tape is usually accommodated in a magnetic tape cartridge and the magnetic tape cartridge is mounted in the magnetic recording and reproducing apparatus. A servo pattern can also be formed on the magnetic tape by a well-known method in order to enable head tracking in the magnetic recording and reproducing apparatus. The "formation of servo pattern" can also be referred to as "recording of servo signal". Hereinafter, the formation of the servo pattern will be described.

The servo pattern is usually formed along a longitudinal direction of the magnetic tape. Examples of control (servo control) types using a servo signal include a timing-based servo (TBS), an amplitude servo, and a frequency servo.

As shown in a European computer manufacturers association (ECMA)-319 (June 2001), a magnetic tape (generally called "LTO tape") conforming to a linear tape-open (LTO) standard employs a timing-based servo type. In this timing-based servo type, the servo pattern is formed by continuously disposing a plurality of pairs of non-parallel magnetic stripes (also referred to as "servo stripes") in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of the servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

As a method for uniquely specifying the servo band, there is a method using a staggered method as shown in ECMA-319 (June 2001). In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing apparatus.

Magnetic Tape Cartridge

Another aspect of the present invention relates to a magnetic tape cartridge including the magnetic tape described above.

The details of the magnetic tape included in the above magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing apparatus for recording and/or reproducing data on the magnetic tape, the magnetic tape is pulled out of the magnetic tape cartridge to be wound around the reel on the magnetic recording and reproducing apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The magnetic tape cartridge may be either a single reel type or a dual reel type magnetic tape cartridge. The above magnetic tape cartridge need only include the magnetic tape according to one aspect of the present invention, and the well-known technology can be applied to the others. The total length of the magnetic tape accommodated in the magnetic tape cartridge may be, for example, 800 m or more, and may be in a range of about 800 m to 2,000 m. It is preferable that the total length of the tape accommodated in the magnetic tape cartridge is long from a viewpoint of increasing the capacity of the magnetic tape cartridge.

Magnetic Recording and Reproducing Apparatus

Still another aspect of the present invention relates to a magnetic recording and reproducing apparatus including the magnetic tape described above.

In the present invention and this specification, the "magnetic recording and reproducing apparatus" means an apparatus capable of performing at least one of the recording of data on the magnetic tape or the reproducing of data recorded on the magnetic tape. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic tape and/or reproducing of the recorded data. For example, the magnetic recording and reproducing apparatus can attachably and detachably include the magnetic tape cartridge.

The magnetic recording and reproducing apparatus can include a magnetic head. The magnetic head can be a recording head capable of performing the recording of data on the magnetic tape, or can be a reproducing head capable of performing the reproducing of data recorded on the magnetic tape. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various well-known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head") can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic tape and/or reproducing of data recorded on the magnetic tape can be performed as the magnetic layer surface of the magnetic tape and the magnetic head come into contact with each other to be slid on each other. The magnetic recording and reproducing apparatus need only include the magnetic tape according to one aspect of the present invention, and the well-known technology can be applied to the others.

For example, in a case of recording data and/or reproducing the recorded data, first, tracking using a servo signal is performed. That is, by causing the servo signal reading element to follow a predetermined servo track, the element for data is controlled to pass on the target data track. Displacement of the data track is performed by changing a servo track to be read by the servo signal reading element in a tape width direction.

The recording and reproducing head can also perform recording and/or reproducing with respect to other data bands. In this case, the servo signal reading element need only be displaced to a predetermined servo band using the above described UDIM information to start tracking for the servo band.

EXAMPLES

Hereinafter, the present invention will be described in more detail with reference to examples. Here, the present invention is not limited to aspects shown in the examples.

"Parts" and "%" in the following description mean "parts by mass" and "mass %", unless otherwise noted. "eq" is an equivalent and is a unit that cannot be converted into an SI unit. The following processes and evaluation were performed in an air atmosphere of 23° C.±1° C., unless otherwise noted.

Example 1-1

Production of ε-Iron Oxide Powder 92.2 g of iron(III) nitrate nonahydrate, 14.4 g of gallium (III) nitrate octahydrate, 2.1 g of cobalt(II) nitrate hexahydrate, 1.7 g of titanium(IV) sulfate, and 16.7 g of polyvinylpyrrolidone (PVP) were dissolved in 1,000 g of pure water, and while the dissolved product was stirred using a magnetic stirrer, 44.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 11 g of citric acid in 100 g of pure water was added to the obtained solution, and the mixture was stirred for 1 hour. The powder sedimented after stirring was collected by centrifugal separation, was washed with pure water, and was dried in a heating furnace at a furnace temperature of 80° C.

8,900 g of pure water was added to the dried powder, and the powder was dispersed again in water to obtain dispersion liquid. The obtained dispersion liquid was heated to a liquid temperature of 50° C., and 440 g of an aqueous ammonia solution having a concentration of 25% was dropwise added with stirring. After stirring for 1 hour while maintaining the temperature at 50° C., 160 mL of tetraethoxysilane (TEOS) was dropwise added and was stirred for 24 hours. Powder sedimented by adding 500 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 995° C. in an air atmosphere and was heat-treated for 4 hours.

The heat-treated powder was put into a 4 mol/L sodium hydroxide (NaOH) aqueous solution, and the mixture was stirred for 24 hours while maintaining the liquid temperature at 70° C. to perform the coat-removing process.

Thereafter, the powder subjected to the coat-removing treatment was collected by centrifugal separation, and was washed with pure water.

5 g of the powder obtained after the washing with pure water, 2.0 g of citric acid, 150 g of zirconia beads, and 25 g of pure water were put into an airtight container and subjected to a dispersion treatment by a paint shaker for 4.0 hours. Thereafter, 180 g of pure water was added to separate the beads from the liquid, and centrifugal separation was performed to sediment ferromagnetic powder, and then a supernatant liquid was removed.

Next, a classification treatment was performed by the following method.

The sedimented ferromagnetic powder was mixed with 190 g of pure water, redispersed by a homogenizer, and the pH was adjusted to 10.0 with ammonia water having a concentration of 25% to obtain a dispersion liquid of particles of ferromagnetic powder. The obtained dispersion liquid was subjected to first centrifugal separation with a centrifugal force of 15,200 G (gravitational acceleration) using a centrifuge (treatment time: "first" classification time in Table 1), and then the sediment and the supernatant liquid were separated by decantation.

Subsequently, the obtained supernatant liquid was subjected to second centrifugal separation with a centrifugal force of 15,200 G using a centrifuge (treatment time: "second" classification time in Table 1), and then the supernatant liquid and the sediment were separated by decantation.

The obtained sediment was washed with pure water and dried in a dryer having an internal atmosphere temperature of 95° C. for 24 hours to obtain ferromagnetic powder.

Composition confirmation of the ferromagnetic powder obtained through the above processes was performed by high-frequency inductively coupled plasma-optical emission spectrometry (ICP-OES), and it was confirmed to be Ga, Co, and Ti substitution type ε-iron oxide ($\varepsilon$-$Ga_{0.28}Co_{0.05}Ti_{0.05}Fe_{1.62}O_3$). In addition, scanning with CuKα rays was performed under conditions of a voltage of 45 kV and an intensity of 40 mA, an X-ray diffraction pattern was measured under the following conditions (X-ray diffraction analysis), and it was confirmed from a peak of the X-ray diffraction pattern that the obtained ferromagnetic powder had an ε-phase crystal structure of a single phase (ε-iron oxide type crystal structure) not including α-phase and γ-phase crystal structures. An average particle size of ε-iron oxide powder thus obtained was determined by the method described above, and the value thereof was shown in Table 1.

PANalytical X'Pert Pro diffractometer, PIXcel detector

Sober slit of incident beam and diffracted beam: 0.017 radians

Fixed angle of dispersion slit: ¼ degrees

Mask: 10 mm

Anti-scattering slit: ¼ degrees

Measurement mode: continuous

Measurement time per stage: 3 seconds

Measurement speed: 0.017 degrees per second

Measurement step: 0.05 degrees

Production of Magnetic Recording Medium (Magnetic Tape)

(1) List of Components of Magnetic Layer Forming Composition Magnetic Liquid

ε-Iron oxide powder produced above: 100.0 parts $SO_3Na$ group-containing polyurethane resin: 14.0 parts (weight-average molecular weight: 70,000, $SO_3Na$ group: 0.4 meq/g)

Cyclohexanone: 150.0 parts

Methyl ethyl ketone: 150.0 parts

Dispersing agent (oleic acid): 2.0 parts

Abrasive Liquid

Abrasive Liquid A

Alumina abrasive (average particle size: 100 nm): 3.0 parts $SO_3Na$ group-containing polyurethane resin: 0.3 parts (weight-average molecular weight: 70,000, $SO_3Na$ group: 0.3 meq/g)

Cyclohexanone: 26.7 parts

Abrasive Liquid B

Diamond abrasive (average particle size: 100 nm): 1.0 part $SO_3Na$ group-containing polyurethane resin: 0.1 parts (weight-average molecular weight: 70,000, $SO_3Na$ group: 0.3 meq/g)

Cyclohexanone: 26.7 parts

Silica Sol

Colloidal silica (average particle size: 100 nm): 0.2 parts

Methyl ethyl ketone: 1.4 parts

Other Components
Stearic acid: 2.0 parts
Butyl stearate: 6.0 parts
Polyisocyanate (CORONATE manufactured by Tosoh Corporation): 2.5 parts
Finishing Additive Solvent
Cyclohexanone: 200.0 parts
Methyl ethyl ketone: 200.0 parts (2) List of Components of Non-Magnetic Layer Forming Composition
Non-magnetic inorganic powder α-iron oxide: 100.0 parts
Average particle size: 10 nm
Average acicular ratio: 1.9
Brunauer-emmett-teller (BET) specific surface area: 75 m$^2$/g
Carbon black (average particle size: 20 nm): 25.0 parts
SO$_3$Na group-containing polyurethane resin: 18.0 parts
(weight-average molecular weight: 70,000, SO$_3$Na group: 0.2 meq/g)
Stearic acid: 1.0 part
Cyclohexanone: 300.0 parts
Methyl ethyl ketone: 300.0 parts (3) List of Components of Back Coating Layer Forming Composition
Non-magnetic inorganic powder α-iron oxide: 80.0 parts
Average particle size: 0.15 μm
Average acicular ratio: 7
BET specific surface area: 52 m$^2$/g
Carbon black (average particle size: 20 nm): 20.0 parts
Vinyl chloride copolymer: 13.0 parts
Sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts (4) Production of Magnetic Tape A magnetic liquid was prepared by dispersing various components of the magnetic liquid. The dispersion treatment was performed using zirconia beads having bead diameters shown in Table 1 as dispersed beads in a batch type vertical sand mill, and the dispersion time was the time shown in Table 1.

The abrasive liquid was prepared by the following method. A dispersion liquid prepared by dispersing various components of the abrasive liquid A and a dispersion liquid prepared by dispersing various components of the abrasive liquid B were prepared. These two kinds of dispersion liquids were mixed, and then subjected to an ultrasonic dispersion treatment for 24 hours by a batch type ultrasonic device (20 kHz, 300 W) to prepare an abrasive liquid.

The magnetic liquid and the abrasive liquid thus obtained were mixed with other components (silica sol, other components, and a finishing additive solvent), and then subjected to an ultrasonic dispersion treatment for 30 minutes by a batch type ultrasonic device (20 kHz, 300 W). Thereafter, filtration was performed using a filter having a pore diameter of 0.5 μm to prepare a magnetic layer forming composition.

For the non-magnetic layer forming composition, the above-described various components were dispersed for 24 hours using a batch type vertical sand mill. As dispersed beads, zirconia beads having a particle diameter of 0.1 mm were used. The obtained dispersion liquid was filtered using a filter having a pore diameter of 0.5 μm to prepare a non-magnetic layer forming composition.

For the back coating layer forming composition, the above-described various components excluding a lubricant (stearic acid and butyl stearate), polyisocyanate, and 200.0 parts of cyclohexanone were kneaded and diluted by an open kneader, and then subjected to a dispersion treatment of 12 passes using a horizontal beads mill dispersing device and zirconia beads having a particle diameter of 1 mm, by setting a bead filling percentage to 80 volume %, a circumferential speed of a rotor tip to 10 msec, and a retention time per pass to 2 minutes. Thereafter, the remaining components were added to the dispersion liquid thus obtained, and the mixture was stirred by a dissolver. The dispersion liquid thus obtained was filtered using a filter having a pore diameter of 1 μm to prepare a back coating layer forming composition.

Thereafter, the non-magnetic layer forming composition was applied onto a biaxially stretched polyethylene naphthalate support having a thickness of 5.0 μm so that the thickness after drying was 0.1 μm, and dried, and then the magnetic layer forming composition was applied thereonto so that the thickness after drying was 0.07 μm to form a coating layer. During the application of the magnetic layer forming composition, vibration was applied as follows by a vibration applying device shown in FIG. 1. The support onto which the magnetic layer forming composition was applied was installed in the vibration applying device shown in FIG. 1 so that a surface opposite to the surface of the support onto which the magnetic layer forming composition was applied was in contact with a vibration applying unit, and vibration was applied to the support (reference numeral 1 in FIG. 1) by transporting the support at a transport speed of 0.5 m/sec. In FIG. 1, reference numeral 2 denotes a guide roller (reference numeral 2 denotes one of two guide rollers), reference numeral 3 denotes a vibration applying device (vibration applying unit including an ultrasonic vibrator), and an arrow indicates a running direction of the support. The time from the start of contact of any portion of the support coated with the magnetic layer forming composition with the vibration applying unit to the end of contact is shown in Table 1 as an ultrasonic vibration applying time. The vibration applying unit used comprises an ultrasonic vibrator inside. Vibration was applied with an ultrasonic frequency and intensity of the ultrasonic vibrator as values shown in Table 1.

Next, the coating layer of the magnetic layer forming composition was subjected to a vertical orientation treatment by applying a magnetic field of a magnetic field intensity of 0.6 T in a direction perpendicular to a surface of the coating layer while the coating layer was in a wet state, and then dried. Thereafter, the back coating layer forming composition was applied onto a surface of the support opposite to the surface on which the non-magnetic layer and the magnetic layer are formed, so that the thickness after drying was 0.4 μm, and dried to form a back coating layer.

Thereafter, a surface smoothing treatment (calendering treatment) was performed using a calender formed of only metal rolls at a speed of 100 m/min, a linear pressure of 294 kN/m, and a surface temperature of a calender roll of 100° C., and then a heat treatment was performed in an environment of an atmosphere temperature of 70° C. for 36 hours. After the heat treatment, the product was slit to have a width of ½ inches to obtain a magnetic tape.

In a state where the magnetic layer of the magnetic tape was demagnetized, a servo pattern having disposition and a shape according to the linear tape-open (LTO) Ultrium format was formed on the magnetic layer by using a servo write head mounted on a servo writer. In this way, a magnetic tape including a data band, a servo band, and a guide band in the disposition according to the LTO Ultrium format in the magnetic layer and including a servo pattern having the disposition and the shape according to the LTO Ultrium format on the servo band was obtained.

Examples 1-2 to 1-4, Examples 2-1 to 2-4, Examples 3-1 to 3-4, and Comparative Examples 1 to 6

Except that the various items shown in Table 1 were changed as shown in Table 1, ε-iron oxide powder and a magnetic tape were produced in the same manner as in Example 1-1.

Composition analysis of the produced ε-iron oxide powder was performed by ICP-OES in the same manner as in Example 1-1, and it was confirmed that all kinds of ε-iron oxide powder were Ga, Co, and Ti substitution type ε-iron oxide (ε-$Ga_{0.28}Co_{0.05}Ti_{0.05}Fe_{1.62}O_3$). In addition, X-ray diffraction analysis was performed in the same manner as in Example 1-1, and it was confirmed that all kinds of ε-iron oxide powder had an ε-phase crystal structure of a single phase (ε-iron oxide type crystal structure) not including α-phase and γ-phase crystal structures. An average particle size of the produced ε-iron oxide powder was determined by the method described above, and the value thereof was shown in Table 1.

In addition, in comparative examples in which "-" is described in the column of the dispersing agent in Table 1, the dispersing agent (oleic acid) was not added to the magnetic liquid.

In Table 1, in comparative examples in which "-" is described in the column of the ultrasonic vibration applying condition, a magnetic tape was produced by a manufacturing process without application of vibration.

For each of the examples and comparative examples, two magnetic tapes were produced, one was used for evaluation of (1) below and the other was used for evaluation of (2) and (3) below.

Evaluation Method (1) Coefficient of Variation of Particle Size of ε-Iron Oxide Powder in Longitudinal Direction of Magnetic Layer 50 sample pieces were cut out from any region of each magnetic tape of examples and comparative examples at an interval of 10 cm in a longitudinal direction. A size of each sample piece was a width of ½ inches and a length of 3 cm.

The magnetic layer surface of each sample piece was subjected to the following coating treatment as a pretreatment before SEM observation.

First, a carbon film (thickness of 80 nm) was formed on the magnetic layer surface by vacuum vapor deposition, and a platinum (Pt) film (thickness of 30 nm) was formed on the formed carbon film surface by sputtering. Vacuum vapor deposition of the carbon film and sputtering of the platinum film were carried out under the following conditions, respectively.

Vacuum Vapor Deposition Condition for Carbon Film

Vapor deposition source: carbon (mechanical pencil lead with a diameter of 0.5 mm)

Degree of vacuum in chamber of vacuum vapor deposition device: $2 \times 10^{-3}$ Pa or less Current value: 16 A Sputtering Condition for Platinum Film Target: Pt Degree of vacuum in chamber of sputtering device: 7 Pa or less Current value: 15 mA For the sample piece after the coating treatment, the particle size was measured by the method described above using SU8220 manufactured by Hitachi High-Tech Corporation as the FE-SEM and image analysis software KS-400 manufactured by Carl Zeiss as the image analysis software, and an arithmetic average dA and a standard deviation dD were obtained from the obtained values. From these results, the coefficient of variation of particle size of ε-iron oxide powder in the longitudinal direction of the magnetic layer was calculated by the expression described above. The calculated values are shown in Table 1.

(2) Electromagnetic Conversion Characteristics (SNR)

For each magnetic tape of examples and comparative examples, a signal-to-noise-ratio (SNR) was measured by the following method.

Using a ½ inches reel tester with a fixed magnetic head, a running speed of the magnetic tape (relative speed between the magnetic head and the magnetic tape) was set to 4 m/sec. A metal-in-gap (MIG) head (gap length of 0.15 μm, track width of 1.0 μm) was used as a recording head, and a recording current was set to the optimum recording current of each magnetic tape. As a reproducing head, a giant-magnetoresistive (GMR) head having an element thickness of 15 nm, a shield interval of 0.1 μm, and a lead width of 0.5 μm was used. The signal was recorded at a linear recording density of 300 kfci, and the reproduced signal was measured by a spectrum analyzer manufactured by Advantest Corporation. The unit kfci is a unit of the linear recording density (cannot be converted into an SI unit system). A ratio of an output value of a carrier signal to an integrated noise in the entire spectrum band was defined as SNR. For the SNR measurement, a signal of a portion (length of 5 m) in which a signal was sufficiently stable after running the magnetic tape was used. Table 1 shows the SNR value as a relative value to a value of Comparative Example 1. In a case where the SNR value is 1.0 dB or more, it can be evaluated that electromagnetic conversion characteristics are excellent.

(3) Running Stability (PES)

A position error signal (PES) was obtained by the following method.

The servo pattern was read by a verify head on the servo writer used to form the servo pattern. The verify head is a reading magnetic head for confirming the quality of the servo pattern formed on the magnetic tape, and an element for reading is disposed at a position corresponding to the position of the servo pattern (position of the magnetic tape in the width direction), in the same manner as the magnetic head of a well-known magnetic recording and reproducing apparatus (drive).

A well-known PES operation circuit which calculates a head positioning accuracy of a servo system as PES from an electric signal obtained by reading the servo pattern by the verify head is connected to the verify head. The PES operation circuit calculates displacement of the magnetic tape in the width direction from the input electric signal (pulse signal) at any time, and calculates a value obtained by applying a high-pass filter (cutoff value: 500 cycles/m) with respect to time variation information (signal) of this displacement, as PES. The PES can be used as an index of running stability, and it can be evaluated that the smaller the value of PES, the more the running stability is excellent.

The above results are shown in Table 1.

TABLE 1

| | Classification time during production of ε-iron oxide powder (min) | | Average particle size of produced ε-iron oxide powder (nm) | Dispersion condition of magnetic liquid | | | Ultrasonic vibration applying condition | | | Coefficient of variation of particle size (%) | | | | |
|---|---|---|---|---|---|---|---|---|---|---|---|---|---|---|
| | First | Second | | Dispersing agent | Dispersing time (hr) | Dispersing time (mm) | Ultrasonic vibration applying time (sec) | Ultrasonic frequency (kHz) | Ultrasonic intensity (W) | dA (nm) | dD (nm) | | SNR (dB) | PES (nm) |
| Example 1-1 | 220 | 360 | 11.5 | Present | 50 | 0.5 | 2 | 30 | 100 | 11.3 | 0.078 | 0.69 | 2.0 | 17 |
| Example 1-2 | 220 | 360 | 11.5 | Present | 50 | 0.5 | 4 | 30 | 100 | 11.3 | 0.069 | 0.61 | 2.0 | 18 |
| Example 1-3 | 220 | 360 | 11.5 | Present | 50 | 0.5 | 6 | 30 | 100 | 11.3 | 0.064 | 0.57 | 2.1 | 20 |
| Example 1-4 | 220 | 360 | 11.5 | Present | 50 | 0.5 | 8 | 30 | 100 | 11.3 | 0.062 | 0.55 | 2.1 | 24 |
| Example 2-1 | 200 | 400 | 11.6 | Present | 50 | 0.5 | 2 | 30 | 100 | 11.1 | 0.333 | 3.00 | 1.7 | 15 |
| Example 2-2 | 200 | 400 | 11.6 | Present | 50 | 0.5 | 4 | 30 | 100 | 11.1 | 0.266 | 2.40 | 1.8 | 15 |
| Example 2-3 | 200 | 400 | 11.6 | Present | 50 | 0.5 | 6 | 30 | 100 | 11.1 | 0.244 | 2.20 | 1.8 | 16 |
| Example 2-4 | 200 | 400 | 11.6 | Present | 50 | 0.5 | 8 | 30 | 100 | 11.1 | 0.233 | 2.10 | 1.9 | 16 |
| Example 3-1 | 150 | 650 | 11.5 | Present | 50 | 0.5 | 2 | 30 | 100 | 11.2 | 0.515 | 4.60 | 1.1 | 12 |
| Example 3-2 | 150 | 650 | 11.5 | Present | 50 | 0.5 | 4 | 30 | 100 | 11.2 | 0.448 | 4.00 | 1.2 | 12 |
| Example 3-3 | 150 | 650 | 11.5 | Present | 50 | 0.5 | 6 | 30 | 100 | 11.2 | 0.414 | 3.70 | 1.4 | 13 |
| Example 3-4 | 150 | 650 | 11.5 | Present | 50 | 0.5 | 8 | 30 | 100 | 11.2 | 0.403 | 3.60 | 1.4 | 14 |
| Comparative Example 1 | 120 | 800 | 11.3 | Present | 50 | 0.5 | 2 | 30 | 100 | 11.1 | 0.611 | 5.50 | 0.0 | 12 |
| Comparative Example 2 | 120 | 800 | 11.3 | — | 1 | 1 | — | — | — | 11.4 | 0.889 | 7.80 | −0.2 | 11 |
| Comparative Example 3 | 150 | 650 | 11.5 | — | 1 | 1 | — | — | — | 11.3 | 0.667 | 5.90 | 0.2 | 12 |
| Comparative Example 4 | 150 | 650 | 11.5 | — | 1 | 1 | 2 | 30 | 100 | 11.1 | 0.577 | 5.20 | 0.3 | 12 |
| Comparative Example 5 | 150 | 650 | 11.5 | Present | 50 | 0.5 | — | — | — | 11.0 | 0.594 | 5.40 | 0.3 | 11 |
| Comparative Example 6 | 240 | 320 | 11.7 | Present | 50 | 0.5 | 2 | 30 | 100 | 11.1 | 0.053 | 0.48 | 2.1 | 50 |

From the results shown in Table 1, it can be confirmed that the magnetic tape of examples includes ε-iron oxide powder as ferromagnetic powder, but is excellent in both electromagnetic conversion characteristics and running stability.

An aspect of the present invention is useful for various types of data storage applications such as data backup and archiving.

What is claimed is:

1. A magnetic tape comprising:
a non-magnetic support; and
a magnetic layer including ferromagnetic powder,
wherein the ferromagnetic powder is ε-iron oxide powder,
a coefficient of variation of particle size of the ε-iron oxide powder in a longitudinal direction of the magnetic layer is 0.55% or more and 5.00% or less, and
the coefficient of variation of particle size is determined according to the following expression by obtaining an average particle size d of ε-iron oxide powder at each of 50 locations at an interval of 10 cm in the longitudinal direction of the magnetic layer and then obtaining an arithmetic average dA and a standard deviation dD of values of the obtained 50 average particle sizes d's, coefficient of variation of particle size=$(dD/dA) \times 100$.

2. The magnetic tape according to claim 1, wherein the arithmetic average dA is 5.0 nm or more and 20.0 nm or less.

3. The magnetic tape according to claim 2, wherein the coefficient of variation of particle size is 0.55% or more and 4.60% or less.

4. The magnetic tape according to claim 1, wherein the arithmetic average dA is 5.0 nm or more and 15.0 nm or less.

5. The magnetic tape according to claim 4, wherein the coefficient of variation of particle size is 0.55% or more and 4.60% or less.

6. The magnetic tape according to claim 1, wherein the coefficient of variation of particle size is 0.55% or more and 4.60% or less.

7. The magnetic tape according to claim 1, wherein the ε-iron oxide powder includes one or more elements selected from the group consisting of a gallium element, a cobalt element, and a titanium element.

8. The magnetic tape according to claim 1, further comprising:

a non-magnetic layer including non-magnetic powder between the non-magnetic support and the magnetic layer.

9. The magnetic tape according to claim 1, further comprising:
a back coating layer including non-magnetic powder on a surface side of the non-magnetic support opposite to a surface side having the magnetic layer.

10. A magnetic tape cartridge comprising:
the magnetic tape according to claim 1.

11. The magnetic tape cartridge according to claim 10, wherein the arithmetic average dA is 5.0 nm or more and 20.0 nm or less.

12. The magnetic tape cartridge according to claim 10, wherein the arithmetic average dA is 5.0 nm or more and 15.0 nm or less.

13. The magnetic tape cartridge according to claim 10, wherein the coefficient of variation of particle size is 0.55% or more and 4.60% or less.

14. The magnetic tape cartridge according to claim 10, wherein the ε-iron oxide powder includes one or more elements selected from the group consisting of a gallium element, a cobalt element, and a titanium element.

15. A magnetic recording and reproducing apparatus comprising:
the magnetic tape according to claim 1.

16. The magnetic recording and reproducing apparatus according to claim 15, wherein the arithmetic average dA is 5.0 nm or more and 20.0 nm or less.

17. The magnetic recording and reproducing apparatus according to claim 15, wherein the arithmetic average dA is 5.0 nm or more and 15.0 nm or less.

18. The magnetic recording and reproducing apparatus according to claim 15, wherein the coefficient of variation of particle size is 0.55% or more and 4.60% or less.

19. The magnetic recording and reproducing apparatus according to claim 15, wherein the ε-iron oxide powder includes one or more elements selected from the group consisting of a gallium element, a cobalt element, and a titanium element.

* * * * *